United States Patent
Gomadam et al.

(10) Patent No.: US 9,130,621 B2
(45) Date of Patent: Sep. 8, 2015

(54) COMMUNICATION SYSTEM USING A MULTI-ANTENNA TRANSMIT PRECODER CODEBOOK

(71) Applicant: Broadcom Corporation, Irvine, CA (US)

(72) Inventors: Krishna Srikanth Gomadam, San Jose, CA (US); Djordje Tujkovic, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/147,245

(22) Filed: Jan. 3, 2014

(65) Prior Publication Data

US 2014/0192916 A1 Jul. 10, 2014

Related U.S. Application Data

(60) Provisional application No. 61/751,099, filed on Jan. 10, 2013.

(51) Int. Cl.
*H04B 7/02* (2006.01)
*H04B 7/04* (2006.01)
*H04B 7/06* (2006.01)

(52) U.S. Cl.
CPC ............ *H04B 7/0469* (2013.01); *H04B 7/0478* (2013.01); *H04B 7/065* (2013.01)

(58) Field of Classification Search
CPC ..... H04B 7/0469; H04B 7/0478; H04B 7/065
USPC ....................................................... 375/267
See application file for complete search history.

(56) References Cited

U.S. PATENT DOCUMENTS

| | | | |
|---|---|---|---|
| 2009/0041150 A1* | 2/2009 | Tsai et al. ...................... | 375/267 |
| 2011/0249712 A1* | 10/2011 | Hammarwall et al. ........ | 375/220 |
| 2011/0305263 A1* | 12/2011 | Jöngren et al. ................ | 375/219 |
| 2012/0003945 A1* | 1/2012 | Liu et al. ..................... | 455/115.1 |
| 2012/0027113 A1* | 2/2012 | Gaal et al. ..................... | 375/267 |

(Continued)

FOREIGN PATENT DOCUMENTS

| | | |
|---|---|---|
| WO | WO 2011/163588 A2 | 12/2011 |
| WO | WO 2012/035425 A1 | 3/2012 |

(Continued)

OTHER PUBLICATIONS

European Search Report for European Application No. EP 14000073.8, European Patent Office, Munich, Germany, mailed on May 8, 2014.

*Primary Examiner* — Juan A Torres
(74) *Attorney, Agent, or Firm* — Sterne, Kessler, Goldstein & Fox P.L.L.C.

(57) ABSTRACT

Systems using a transmit precoder codebook designed for a four-transmitter (4Tx) antenna configuration are described. The 4Tx antenna configuration is an attractive option for base stations in cellular network environments due to site-acquiring advantages and robust performance. In an embodiment, the transmit precoder codebook can be used for a variety of transmit antenna configurations and has a high resolution to enable beamforming and/or nulling. In another embodiment, the transmit precoder codebook is a two-component codebook, with a first precoder component signaled at a first frequency and a second precoder component signaled at a second higher frequency.

20 Claims, 7 Drawing Sheets

| $W_1(i)$ \ $W_2$ | 0 | 1 | 2 | 3 | |
|---|---|---|---|---|---|
| $i = 1$, $\Theta_1=0, \Theta_2=0$ | $v_{UNCOR}(\Theta_1, \Theta_2, c=1)$ | $v_{UNCOR}(\Theta_1, \Theta_2, c=j)$ | $v_{UNCOR}(\Theta_1, \Theta_2, c=-j)$ | $v_{UNCOR}(\Theta_1, \Theta_2, c=-1)$ | 902.1 |
| $i = 2$, $\Theta_1=0, \Theta_2=\pi$ | $v_{UNCOR}(\Theta_1, \Theta_2, c=1)$ | $v_{UNCOR}(\Theta_1, \Theta_2, c=j)$ | $v_{UNCOR}(\Theta_1, \Theta_2, c=-j)$ | $v_{UNCOR}(\Theta_1, \Theta_2, c=-1)$ | 902.2 |
| $i = 3$, $\Theta_1=\pi, \Theta_2=0$ | $v_{UNCOR}(\Theta_1, \Theta_2, c=1)$ | $v_{UNCOR}(\Theta_1, \Theta_2, c=j)$ | $v_{UNCOR}(\Theta_1, \Theta_2, c=-j)$ | $v_{UNCOR}(\Theta_1, \Theta_2, c=-1)$ | 902.3 |
| $i = 4$, $\Theta_1=\pi, \Theta_2=\pi$ | $v_{UNCOR}(\Theta_1, \Theta_2, c=1)$ | $v_{UNCOR}(\Theta_1, \Theta_2, c=j)$ | $v_{UNCOR}(\Theta_1, \Theta_2, c=-j)$ | $v_{UNCOR}(\Theta_1, \Theta_2, c=-1)$ | 902.4 |

900

(56) References Cited

U.S. PATENT DOCUMENTS

| | | |
|---|---|---|
| 2012/0039251 A1* | 2/2012 | Sayana et al. ............... 370/328 |
| 2012/0063500 A1* | 3/2012 | Wang et al. ................. 375/224 |
| 2012/0076028 A1* | 3/2012 | Ko et al. ..................... 370/252 |
| 2012/0087425 A1* | 4/2012 | Gomadam et al. ........... 375/260 |
| 2012/0219042 A1* | 8/2012 | Onggosanusi et al. ....... 375/219 |
| 2013/0058307 A1* | 3/2013 | Kim et al. ................... 370/329 |
| 2013/0129014 A1* | 5/2013 | Kim et al. ................... 375/295 |
| 2013/0163461 A1* | 6/2013 | Kim et al. ................... 370/252 |
| 2013/0170578 A1* | 7/2013 | Wu et al. ..................... 375/295 |
| 2013/0266084 A1* | 10/2013 | Clerckx et al. ............. 375/267 |
| 2013/0279619 A1* | 10/2013 | Chen et al. ................. 375/267 |
| 2013/0294352 A1* | 11/2013 | Park et al. .................. 370/328 |
| 2013/0315189 A1* | 11/2013 | Kim et al. ................... 370/329 |
| 2014/0064203 A1* | 3/2014 | Seo et al. .................... 370/329 |
| 2014/0226746 A1* | 8/2014 | Ko et al. ..................... 375/267 |

FOREIGN PATENT DOCUMENTS

| | | | |
|---|---|---|---|
| WO | WO 2012105793 A2 * | 8/2012 | |
| WO | WO 2012148136 A2 * | 11/2012 | |

* cited by examiner

| $W_1(i)$ \ $W_2$ | 0 | 1 | 2 | 3 |
|---|---|---|---|---|
| i = 0 | $v_{ULA}(\theta_{-2})$ | $v_{ULA}(\theta_{-1})$ | $v_{ULA}(\theta_0)$ | $v_{ULA}(\theta_1)$ |
| i = 1 | $v_{ULA}(\theta_0)$ | $v_{ULA}(\theta_1)$ | $v_{ULA}(\theta_2)$ | $v_{ULA}(\theta_3)$ |
| ... | | | | |
| i = N | $v_{ULA}(\theta_{2N-2})$ | $v_{ULA}(\theta_{2N-1})$ | $v_{ULA}(\theta_{2N})$ | $v_{ULA}(\theta_{2N+1})$ |

| $W_2$ \ $W_1(i)$ | 0 | 1 | 2 | 3 | 4 | 5 | 6 | 7 |
|---|---|---|---|---|---|---|---|---|
| $i=0$ | $W_1(0)\frac{1}{\sqrt{2}}\begin{bmatrix}1&0\\1&0\end{bmatrix}$ | $W_1(0)\frac{1}{\sqrt{2}}\begin{bmatrix}0&1\\1&0\end{bmatrix}$ | $W_1(0)\frac{1}{\sqrt{2}}\begin{bmatrix}1&0\\j&0\end{bmatrix}$ | $W_1(0)\frac{1}{\sqrt{2}}\begin{bmatrix}0&1\\0&j\end{bmatrix}$ | $W_1(0)\frac{1}{\sqrt{2}}\begin{bmatrix}1&0\\-1&0\end{bmatrix}$ | $W_1(0)\frac{1}{\sqrt{2}}\begin{bmatrix}0&1\\0&-1\end{bmatrix}$ | $W_1(0)\frac{1}{\sqrt{2}}\begin{bmatrix}1&0\\-j&0\end{bmatrix}$ | $W_1(0)\frac{1}{\sqrt{2}}\begin{bmatrix}0&1\\0&-j\end{bmatrix}$ |
| $i=1$ | $W_1(1)\frac{1}{\sqrt{2}}\begin{bmatrix}1&0\\1&0\end{bmatrix}$ | $W_1(1)\frac{1}{\sqrt{2}}\begin{bmatrix}0&1\\1&0\end{bmatrix}$ | $W_1(1)\frac{1}{\sqrt{2}}\begin{bmatrix}1&0\\j&0\end{bmatrix}$ | $W_1(1)\frac{1}{\sqrt{2}}\begin{bmatrix}0&1\\0&j\end{bmatrix}$ | $W_1(1)\frac{1}{\sqrt{2}}\begin{bmatrix}1&0\\-1&0\end{bmatrix}$ | $W_1(1)\frac{1}{\sqrt{2}}\begin{bmatrix}0&1\\0&-1\end{bmatrix}$ | $W_1(1)\frac{1}{\sqrt{2}}\begin{bmatrix}1&0\\-j&0\end{bmatrix}$ | $W_1(1)\frac{1}{\sqrt{2}}\begin{bmatrix}0&1\\0&-j\end{bmatrix}$ |
| ... | | | | | | | | |
| $i=N$ | $W_1(N)\frac{1}{\sqrt{2}}\begin{bmatrix}1&0\\1&0\end{bmatrix}$ | $W_1(N)\frac{1}{\sqrt{2}}\begin{bmatrix}0&1\\1&0\end{bmatrix}$ | $W_1(N)\frac{1}{\sqrt{2}}\begin{bmatrix}1&0\\j&0\end{bmatrix}$ | $W_1(N)\frac{1}{\sqrt{2}}\begin{bmatrix}0&1\\0&j\end{bmatrix}$ | $W_1(N)\frac{1}{\sqrt{2}}\begin{bmatrix}1&0\\-1&0\end{bmatrix}$ | $W_1(N)\frac{1}{\sqrt{2}}\begin{bmatrix}0&1\\0&-1\end{bmatrix}$ | $W_1(N)\frac{1}{\sqrt{2}}\begin{bmatrix}1&0\\-j&0\end{bmatrix}$ | $W_1(N)\frac{1}{\sqrt{2}}\begin{bmatrix}0&1\\0&-j\end{bmatrix}$ |

| $W_1(i)$ \ $W_2$ | 0 | 1 | 2 | 3 |
|---|---|---|---|---|
| i = 0 | x(0)<br>x(0) | x(0)<br>-x(0) | x(0)<br>jx(0) | x(0)<br>-jx(0) |
| i = 2 | x(1)<br>x(1) | x(1)<br>-x(1) | x(1)<br>jx(1) | x(1)<br>-jx(1) |
| ... | | | | |
| i = N | x(N)<br>x(N) | x(N)<br>-x(N) | x(N)<br>jx(N) | x(N)<br>-jx(N) |

| $W_1(i)$ \ $W_2$ | 0 | 1 | 2 | 3 |
|---|---|---|---|---|
| $i=1$, $\Theta_1=0$, $\Theta_2=0$ | $V_{UNCOR}(\Theta_1, \Theta_2, c=1)$ | $V_{UNCOR}(\Theta_1, \Theta_2, c=j)$ | $V_{UNCOR}(\Theta_1, \Theta_2, c=-j)$ | $V_{UNCOR}(\Theta_1, \Theta_2, c=-1)$ |
| $i=2$, $\Theta_1=0$, $\Theta_2=\pi$ | $V_{UNCOR}(\Theta_1, \Theta_2, c=1)$ | $V_{UNCOR}(\Theta_1, \Theta_2, c=j)$ | $V_{UNCOR}(\Theta_1, \Theta_2, c=-j)$ | $V_{UNCOR}(\Theta_1, \Theta_2, c=-1)$ |
| $i=3$, $\Theta_1=\pi$, $\Theta_2=0$ | $V_{UNCOR}(\Theta_1, \Theta_2, c=1)$ | $V_{UNCOR}(\Theta_1, \Theta_2, c=j)$ | $V_{UNCOR}(\Theta_1, \Theta_2, c=-j)$ | $V_{UNCOR}(\Theta_1, \Theta_2, c=-1)$ |
| $i=4$, $\Theta_1=\pi$, $\Theta_2=\pi$ | $V_{UNCOR}(\Theta_1, \Theta_2, c=1)$ | $V_{UNCOR}(\Theta_1, \Theta_2, c=j)$ | $V_{UNCOR}(\Theta_1, \Theta_2, c=-j)$ | $V_{UNCOR}(\Theta_1, \Theta_2, c=-1)$ |

COMMUNICATION SYSTEM USING A MULTI-ANTENNA TRANSMIT PRECODER CODEBOOK

CROSS-REFERENCE TO RELATED APPLICATION(S)

The present application claims the benefit of U.S. Provisional Application No. 61/751,099, filed Jan. 10, 2013, which is incorporated herein by reference in its entirety.

TECHNICAL FIELD

The present disclosure relates generally to multi-antenna transmit precoding, including a transmit precoder codebook for multi-antenna transmission.

BACKGROUND

Background Art

Current cellular technology standards (e.g., Long Term Evolution (LTE)) support various multi-transmit antenna configurations, in which a user equipment (UE) can receive simultaneous transmissions from multiple transmit antennas of the network. This requires that the simultaneous transmissions be pre-coded with respective transmit precoders so as not to interfere with each other at the UE.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
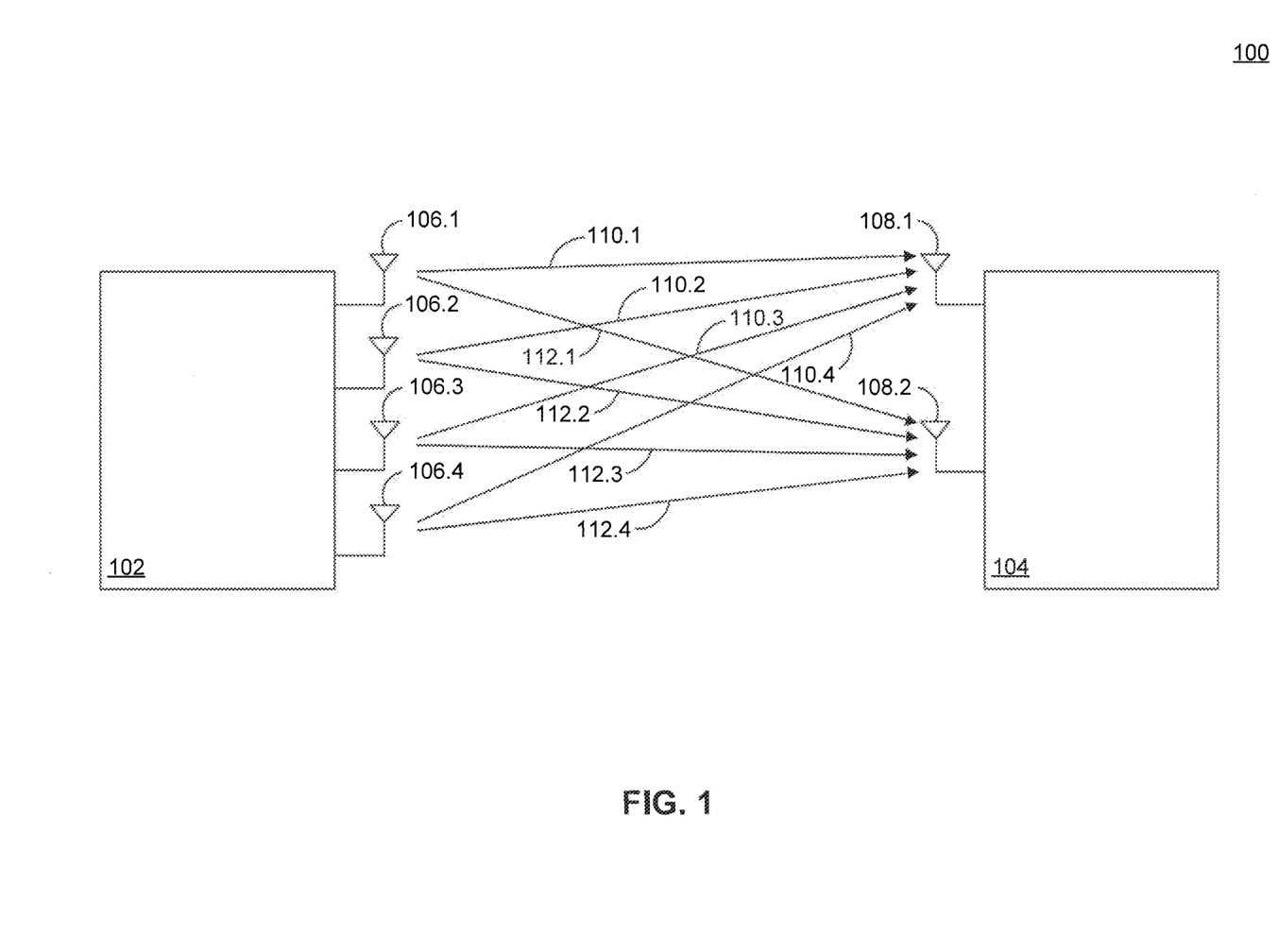
FIG. 1 illustrates an example environment in which embodiments can be implemented or practiced.

FIG. 1 illustrates an example environment 100 in which embodiments can be implemented or practiced. Example environment 100 is provided for the purpose of illustration only and is not limiting of embodiments. As shown in FIG. 1, example environment 100 inc hides a first communication device 102 and a second communication device 104 that can communicate wirelessly with each other. For the purpose of illustration only, communication device 102 is shown as having four antennas 106.1-106.4 and communication device 104 is shown as having two antennas 108.1 and 108.2.

In embodiments, communication devices 102 and 104 can be part of or can form a wireless communication network, including, without limitation, a cellular network, a Wireless Local Area Network (WLAN), and a Bluetooth® network. For example, communication devices 102 and 104 can be a base station and a user equipment (UE) respectively (or vice versa) in a cellular network. The cellular network can operate using existing 3G/4G cellular technology standards (e.g., Long Term Evolution (LTE), Wideband Code Division Multiple Access (WCDMA), WiMAX, etc.) or future 5G cellular technology standards (e.g., LTE-Advanced). Alternatively, communication devices 102 and 104 can be an Access Point (AP) and a WLAN client device respectively (or vice versa) in a WLAN network, or a master node and a slave node respectively (or vice versa) of a Bluetooth® connection.

In an embodiment, communication device 102 can use antennas 106.1-106.4 to transmit one or more data signals (data streams) to communication device 104. For example, in an embodiment, communication device 102 can use antennas 106.1-106.4 to transmit respectively signals 110.1-110.4 to communication device 104. In another embodiment, signals 110.1-110.4 include the same data signal, and communication device 102 transmits signals 110.1-110.4 simultaneously while pre-coding (applying an amplitude and/or phase scalar to) one or more of signals 110.1-110.4 such that signals 110.1-110.4 combine constructively at antenna 108.1 of communication device 104. Additionally, the pre-coding can be such that signals 110.1-110.4 combine destructively or create a null at antenna 108.2 of communication device 104. The constructive combining of signals 1101-110.4 at antenna 108.1 (e.g., to maximize signal power) is known as beamforming, and the amplitude/phase scalars applied to signals 110.1-110.4 form a vector known as a transmit precoder. In example environment 100, a transmit precoder vector to transmit signals 110.1-110.4 can be a 4×1 vector (rank 1), with one element (indicating the respective amplitude and/or phase scalar) for each of antennas 106.1-106.4.

In another embodiment, communication device 102 can use antennas 106.1-106.4 to further transmit (simultaneously with the transmission of signals 110.1-110.4) respectively signals 112.1-112.4 to communication device 104. In an embodiment, signals 112.1-112.4 include the same data signal, and communication device 102 transmits signals 112.1-112.4 simultaneously while pre-coding (applying an amplitude and/or phase scalar to) one or more of signals 112.1-112.4 such that signals 112.1-112.4 combine constructively at antenna 108.2 of communication device 104.

As for signals 110.1-110.4, a 4×1 transmit precoder is used to pre-code signals 112.1-112.4. As such, communication device 102 can use two 4×1 transmit precoders or a 4×2 (rank 2) transmit precoder to simultaneously transmit two data streams to communication device 104.

Generally, in order to determine the appropriate transmit precoder(s) for transmission to communication device 104, communication device 102 must have knowledge of the channel(s) from communication device 102 to communication device 104. For example, in order to beamform at antenna 108.1 of communication device 104, the transmit precoder applied by communication device 102 must capture the 4×1 channel formed between antennas 106.1-106.4 of communication device 102 and antenna 108.1 of communication device 104.

In practice, obtaining channel knowledge at communication device 102 may be inefficient. For example, in a cellular network environment, the downlink channel (from the base station to the UE) can be readily estimated at the UE. While the channel estimate can be signaled to the base station from the UE, such signaling can consume significant resources and can be undesirable. Instead, it is more efficient for the UE to compute and signal to the base station the transmit precoder(s) that enable beamforming or multi-stream transmission from the base station to the UE. Typically, this is done by signaling an index that specifies a transmit precoder from a finite set of transmit precoders (available at both the UE and the base station), also known as a transmit precoder codebook. The specified transmit precoder is the closest to the computed transmit precoder within the transmit precoder codebook.

In the following, systems using a transmit precoder codebook designed for a four-transmitter (4Tx) antenna configuration (e.g., as in communication device 102) are described. The 4Tx antenna configuration is an attractive option for base stations in cellular network environments due to site-acquiring advantages and robust performance. As further described below, the transmit precoder codebook can be used for a variety of transmit antenna configurations and has a high resolution to enable beamforming and/or nulling. In an embodiment, the transmit precoder codebook is a two-component codebook, with a first precoder component signaled at a first frequency and a second precoder component signaled at a second higher frequency. As such, the overhead required to signal a transmit precoder can be reduced.

Figure 2:
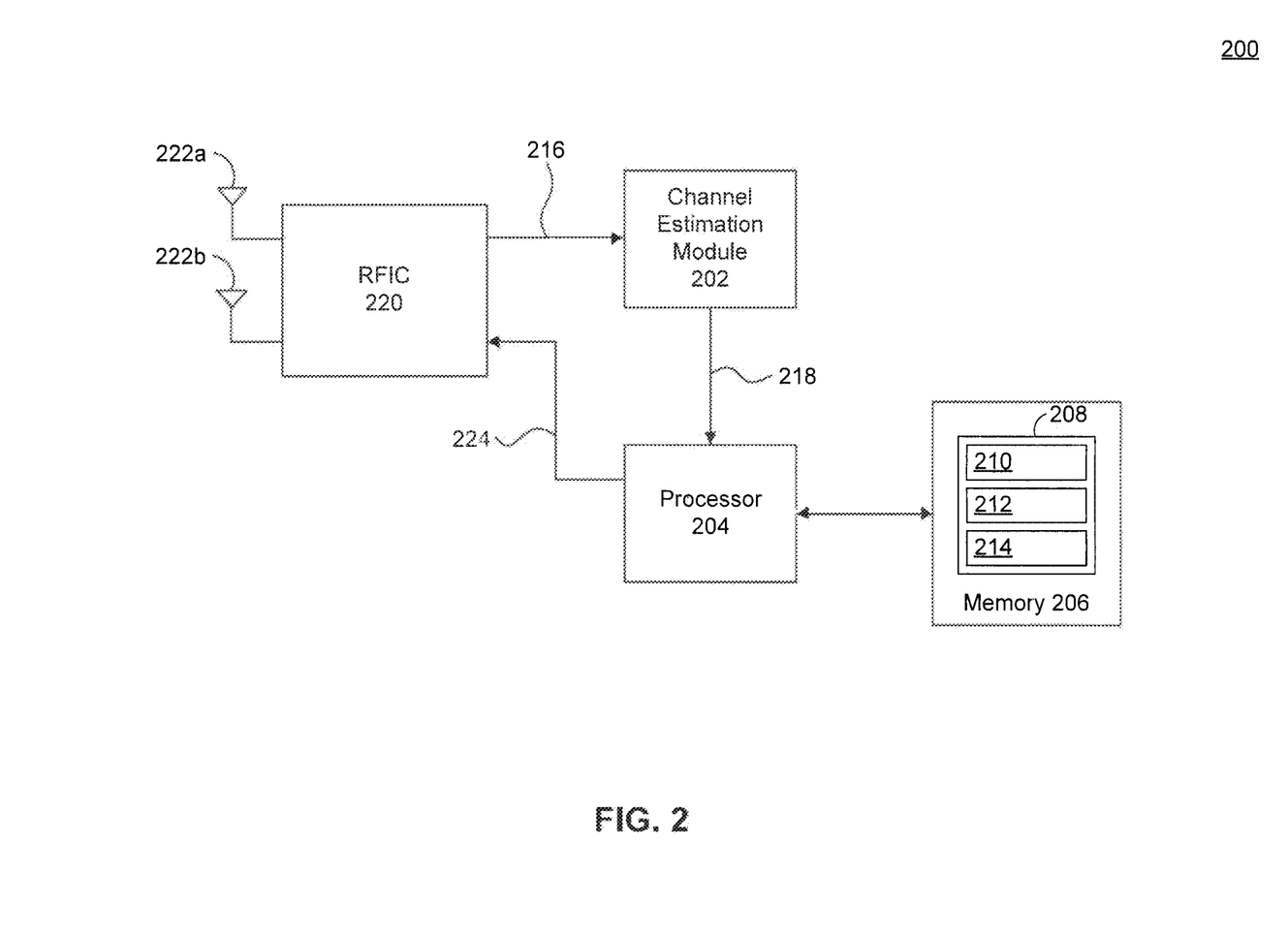
FIG. 2 illustrates an example communication device according to an embodiment.

FIG. 2 illustrates an example communication device 200 in which embodiments can be implemented or practiced. Example communication device 200 is provided for the purpose of illustration only and is not limiting of embodiments. Example communication device 200 can be an embodiment of communication device 104, for example. As such, example communication device 200 can be configured to receive one or more data streams from another communication device. For example, example communication device 200 can be a UE configured to receive one or more data streams from a base station. As further described below, example communication device 200 can assist the other communication device in order to beamform the one or more data streams to communication device 200, by selecting and signaling appropriate transmit precoders to the other communication device.

As shown in FIG. 2, example communication device 200 includes, without limitation, a transmitter comprised of a plurality of antennas 222a-b and a radio frequency integrated circuit (RFIC) 220; a channel estimation module 202; a processor 204; and a memory 206. In an embodiment, memory 206 is configured to store a transmit precoder codebook 208. Transmit precoder codebook 208 includes a plurality of transmit precoders. In an embodiment, communication device 200 can signal a transmit precoder from the plurality of transmit precoders to the other communication device. The other communication device can use the signaled transmit precoder to beamform transmitted signals to example communication device 200. Communication device 200 can signal a transmit precoder periodically to the other communication device or when changes in the channel from other communication device is detected.

In an embodiment, communication device 200 can receive one or more signals from the other communication device using antennas 222a-b. In other embodiments, communication device 200 can have more or less than two antennas. The signals received by antennas 222a-b are processed by RFIC 220, which may filter, down-convert, and digitize the received signals and then provide the signals in the form of a baseband signal 216 to channel estimation module 202. In other embodiments (not illustrated in FIG. 2), RFIC 220 may provide baseband signal 216 to processor 204, which may perform demodulation of baseband signal 216 to retrieve the information contained therein.

In an embodiment, channel estimation module 202 is configured to process baseband signal 216 to generate a channel estimate of a channel from the other communication device to communication device 200. The channel estimate can be represented by a matrix of size N×M, where N is the number of antennas at the other communication device and M is the number of antennas at communication device 200. Channel estimation module 202 provides the channel estimate by means of an output signal 218 to processor 204.

Processor 204 is configured to determine a transmit precoder for the other communication device based on the channel estimate received from channel estimation module 202. In an embodiment, the other communication device includes four antennas and the transmit precoder is a four-transmitter (4Tx) precoder. In embodiment, the transmit precoder can be a 4×n vector, where n is any integer greater than or equal to one. For example, to beamform a single data stream to communication device 200, the transmit precoder can be a 4×1 vector (rank 1), with one element (indicating a respective amplitude and/or phase scalar) for each of the four antennas of the other communication device. For two simultaneous data streams, the transmit precoder can be a 4×2 vector (rank 2), with two elements (indicating two respective amplitude and/or phase scalars) for each of the four antennas of the other communication device.

In an embodiment, processor 204 is configured to determine the transmit precoder, based on the channel estimate, from codebook 208 stored in memory 206. As mentioned above, transmit precoder codebook 208 includes a plurality of transmit precoders. Accordingly, in an embodiment, processor 204 is configured to select as the transmit precoder a transmit precoder, from among the plurality of transmit precoders of codebook 208, which results in a desired (e.g., maximum) signal strength at communication device 200. For example, in an embodiment, processor 204 computes the product |W*H| (where W denotes the transmit precoder and |W*H| denotes the channel estimate) for each of the plurality of transmit precoders of codebook 208 and selects the transmit precoder that maximizes the product |W*H| as the transmit precoder.

In another embodiment, transmit precoder codebook 208 includes a plurality of sub-codebooks 210, 212, and 214, each designed for a particular antenna configuration of the other communication device. For example, sub codebook 210 may include transmit precoders designed for a Closely Spaced Uniform Linear Array (C-ULA) configuration. Sub-codebook 212 may include transmit precoders designed for a Closely Spaced Cross Polarized Antenna Array (C-XPOL) configuration, and sub-codebook 214 may include transmit precoders designed for a Widely Spaced Cross Polarized Antenna Array configuration. Accordingly, in an embodiment, processor 204 is configured to determine an antenna configuration of the other communication device and to determine the transmit precoder from a sub-codebook of codebook 208 associated with the determined antenna configuration of the other communication device. This reduces the amount of processing necessary to determine the transmit precoder. In an embodiment, such as in a cellular network environment, the base station can signal its antenna configuration to the UE at network attachment. The UE can use the learned antenna configuration to decide which of sub-codebooks 210, 212, and 214 to use for the base station.

Having determined the transmit precoder based on the channel estimate, processor 204 forwards the determined transmit precoder by means of an output signal 224 to RFIC 220. RFIC 220 along with antenna 222a and/or 222b signal the transmit precoder to the other communication device. In an embodiment, the signaling of the transmit precoder includes signaling an index front codebook 208 (or a sub-codebook). The other communication device, having codebook 208 available, can retrieve the transmit precoder identified by the signaled index and apply it to its transmissions to communication device 200.

In an embodiment, communication device 200 repeats the above described process periodically and signals a transmit precoder periodically to the other communication device. As channel conditions change over time, the signaled transmit precoder can also vary. In an embodiment, as further described below, the transmit precoder is formed b a first precoder component and a second precoder component, which together describe the transmit precoder to the other communication device. In an embodiment, to signal the transmit precoder, communication device 200 signals the first and second precoder components simultaneously or at different times. In another embodiment, the first precoder component is designed to capture a long term or wideband (e.g., slow varying across time and/or frequency) characteristic of the channel and the second precoder component is designed to capture a short term or narrowband (e.g., more rapidly varying across time and/or frequency) characteristic of the channel. As such, communication device 200 can signal the first precoder component and the second precoder component at different frequencies, e.g., signal the first precoder component at a lower frequency than the second precoder component to the other communication device.

In an embodiment, as mentioned above, transmit precoder codebook 208 includes a sub-codebook 210 designed for a Closely Spaced Uniform Linear Array antenna configuration at the other communication device. Example embodiments for designing and using sub-codebook 210 are described below.

Figure 3:
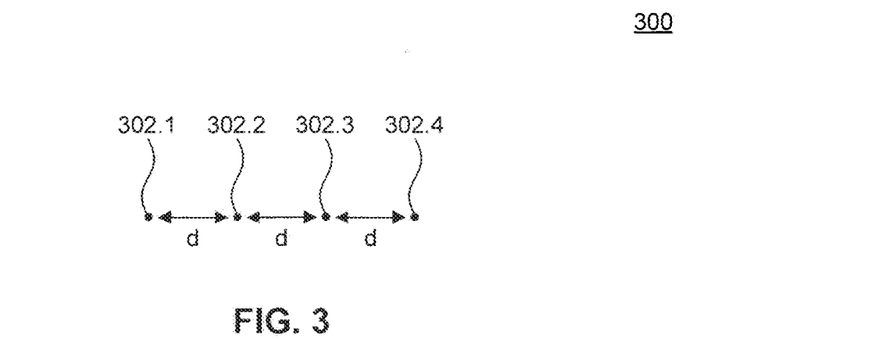
FIG. 3 illustrates an example Closely Spaced Uniform Linear Array antenna configuration.

FIG. 3 illustrates an example Closely Spaced Uniform Linear Array antenna configuration 300. Example configuration 300 is provided for the purpose of illustration only and is not limiting of embodiments. For example, example configuration 300 illustrates a four-transmitter (4Tx) antenna configuration. However, embodiments are not limited to 4Tx, and can be extended to other transmitter configurations, including two-transmitter (2Tx) and 8-transmitter (8Tx) antenna configurations, for example. For the purpose of illustration, example configuration 300 is described with reference to example environment 100, where first communication device 102 uses example configuration 300 to transmit one or more data streams to second communication device 104. Second communication device 104 can be embodied by example communication device 200 in such an embodiment.

As shown in FIG. 3, example configuration 300 includes four transmit antennas 302.1, 302.2, 302.3, and 302.4 that are placed in a one-dimensional linear fashion, with any two consecutive antennas being at a distance d from each other. When closely spaced, antennas 302.1, 302.2, 302.3, and 302.4 form a Closely Spaced Uniform Linear Array (C-ULA). The principal Eigen direction of a 4Tx C-ULA antenna configuration can be closely approximated by a Discrete Fourier Transform (DFT) vector that is given by:

$$v_{ULA}(\theta) = \begin{bmatrix} 1 \\ e^{-j\theta} \\ e^{-j2\theta} \\ e^{-j3\theta} \end{bmatrix} \quad (1)$$

where $\theta$ denotes a phase difference due to physical separation (separation phase difference) between antennas 302.1, 302.2, 302.3, and 302.4.

With reference to FIG. 3, the physical separation is the distance d that separates any two consecutive antennas of antennas 302.1-302.4, and equation (1) provides, for example, that a signal transmitted by antenna 302.2 would be received (by an antenna of second communication device 104) with a phase offset of $\theta$ relative to a signal transmitted by antenna 302.1 due to the distance d that separates antennas 302.1 and 302.2. Similarly, the signal transmitted by antenna 302.3 would be received with a phase offset of $\theta$ relative to the signal transmitted by antenna 302.2 (or $2\theta$ relative to the signal transmitted by antenna 302.1), and the signal transmitted by antenna 302.4 would be received with a phase offset of $\theta$ relative to the signal transmitted by antenna 302.3 (or $3\theta$ relative to the signal transmitted by antenna 302.1).

To have the signals transmitted by antennas 302.1-302.4 received at the same time (i.e., without relative phase offset) at communication device 104, a transmit precoder is applied at communication device 102 to compensate for the separation phase difference $\theta$ between antennas 302.1, 302.2, 302.3, and 302.4. As described above, the transmit precoder is signaled by communication device 104 to communication device 102.

In an embodiment, the transmit precoder includes a first precoder component and a second precoder component. The first precoder component is configured to compensate for a long term (in time) or a wideband (in frequency) variation of the separation phase difference $\theta$, and the second precoder component is configured to compensate for a short term (in time) or a narrowband (in frequency) variation of the separation phase difference $\theta$. The first precoder component and the second precoder component are signaled at different frequencies, e.g., the first precoder component is signaled at a lower frequency than the second precoder component.

Figure 6:
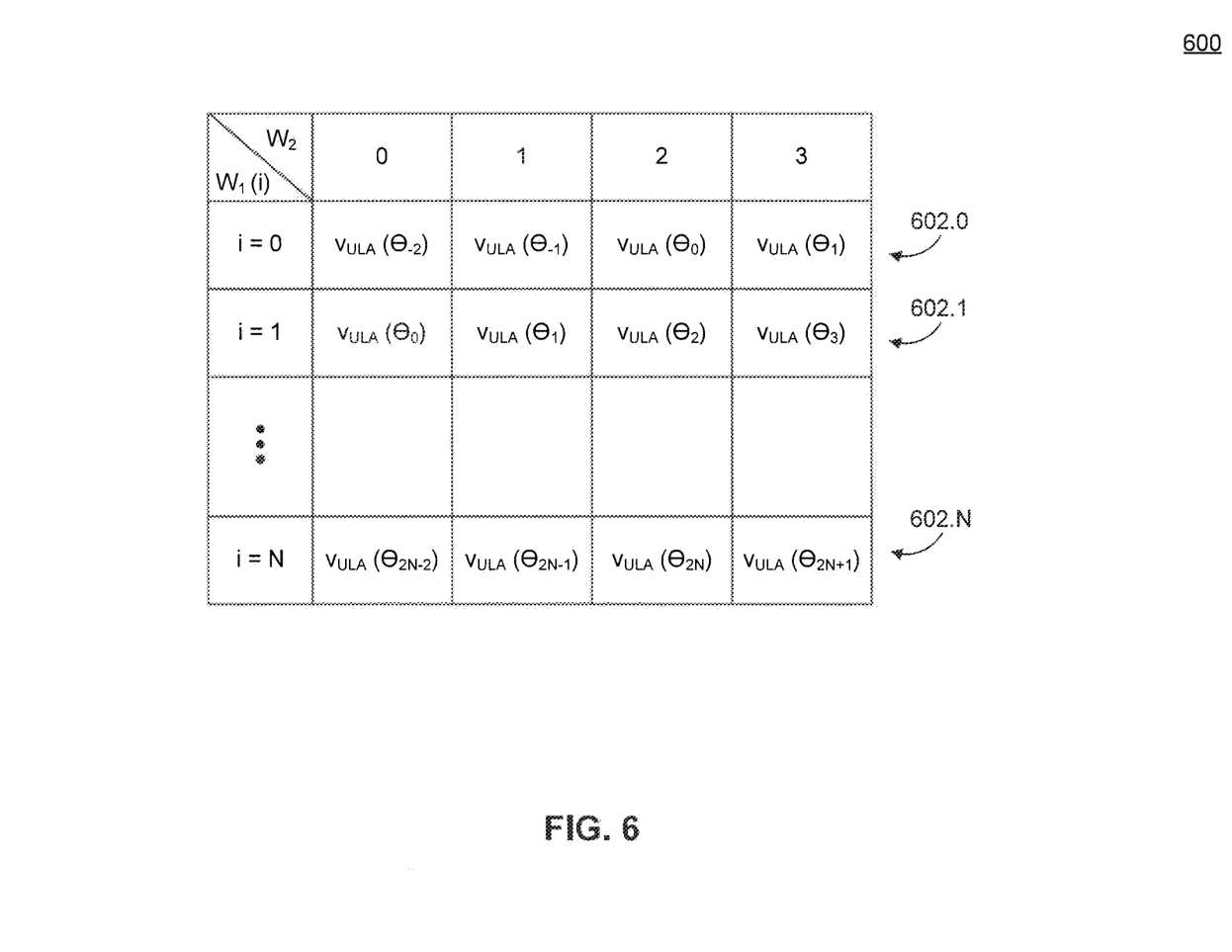
FIGS. 6-9 illustrates example transmit precoder codebooks according to embodiments.

In an embodiment, sub-codebook 210 (of the transmit precoder codebook) designed for a C-ULA antenna configuration includes a transmit precoder matrix as illustrated by example matrix 600 of FIG. 6. Example matrix 600 is provided for the purpose of illustration only and is not limiting of embodiments. For example, in other embodiments, matrix 600 can include more than four column vectors.

As shown in FIG. 6, example matrix 600 includes N+1 row vectors 602.0-602.N, where N is an integer, and four column vectors. In an embodiment, N is equal to 7, resulting in 8 row vectors. In an embodiment, example matrix 600 is given by:

$$W_1(i) = [v_{ULA}(\theta_{2i-2}) \; v_{ULA}(\theta_{2i-1}) \; v_{ULA}(\theta_{2i}) \; v_{ULA}(\theta_{2i+1})], \\ i=0, \ldots, N \quad (2)$$

where $$\theta_k = \frac{2\pi k}{16}$$ (2)

and $v_{ULA}(\theta)$ is as provided above in equation (1).

In an embodiment, each row vector 602.0-602.N of transmit precoder matrix 600 corresponds to one option for the first precoder component of the transmit precoder. In an embodiment, after determining the transmit precoder as described above (e.g., the transmit precoder that maximizes signal strength), communication device 104 (e.g., using processor 204) selects the first precoder component as the row vector from the N+1 row vectors 602.0-602.N of transmit precoder matrix 600 that includes the determined transmit precoder. For example, if the determined transmit precoder is included in row vector 602.1 corresponding to i=1, then the selected first precoder component corresponds to $W_1(i=1)$ in example matrix 600. The index (i=1) corresponding to the selected first precoder component is signaled to the other communication device.

As shown in FIG. 6, each row vector 602.0-602.N of transmit precoder matrix 600 includes a plurality (e.g., four) of elements, each corresponding to a respective transmit precoder. As such, signaling a first precoder component is equivalent to signaling a plurality of transmit precoders. To further refine the choice of transmit precoder, communication device 104 (e.g., using processor 204) selects the second precoder component to identify one element of the plurality of elements of the signaled first precoder component. For example, if the determined transmit precoder corresponds to the precoder indicated by $v_{ULA}(\theta_1)$ in example matrix 600, then after signaling the index i=1 for the first precoder component, the second precoder component is signaled by signaling $W_2=1$. The first precoder component and the second precoder component thus identify a single transmit precoder to the other communication device.

In an embodiment, as illustrated in FIG. 6, signaling an index (e.g., i=0) for the first precoder component signals four consecutive (e.g., closely spaced) and uniformly spaced (i.e., same step size in k from one entry to the next) $v_{ULA}(\theta)$ entries (e.g., corresponding to $\theta_{-2}$, $\theta_{-1}$, $\theta_0$, and $\theta_1$). In another embodiment, the entries of example matrix 600 can be configured such that signaling an index results in signaling non-consecutive (e.g., widely spaced) and/or non-uniformly spaced (i.e., same or different steps sizes in k from one entry to the next) $v_{ULA}(\theta)$ entries.

In an embodiment, as mentioned above, the first precoder component is signaled at a lower frequency than the second precoder component. As such, in between signaling of the first precoder component, the second precoder component can be signaled one or more times to identify one or more transmit precoders of the plurality of transmit precoders signaled by the first precoder component. For example, if the selected first precoder component corresponds to $W_1(i=1)$ in example matrix 600, then the second precoder component can be selected from the transmit precoders indicated by $v_{ULA}(\theta_0)$, $v_{ULA}(\theta_1)$, $v_{ULA}(\theta_2)$, $v_{ULA}(\theta_3)$. In an embodiment, in between signaling of the first precoder component, only the subset of transmit precoders identified by the signaled first precoder component is tested to determine the transmit precoder that is identified by the second precoder component.

Returning to FIG. 2, in another embodiment, as mentioned above, transmit precoder codebook 208 includes a sub-codebook 212 designed for a Closely Spaced Cross Polarized Antenna Array configuration at the other communication device. Example embodiments for designing and using sub-codebook 212 are described below.

Figure 4:
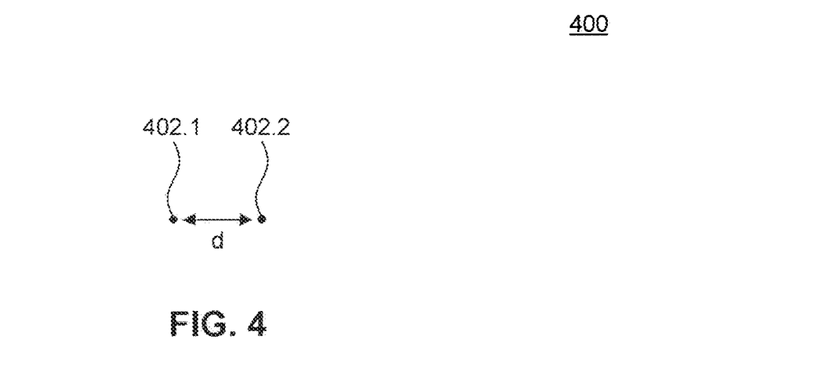
FIG. 4 illustrates an example Closely Spaced Cross Polarized Antenna Array configuration.

FIG. 4 illustrates an example Closely Spaced Cross Polarized Antenna Array configuration 400. Example configuration 400 is provided for the purpose of illustration only and is not limiting of embodiments. For example, example configuration 400 illustrates a four-transmitter (4Tx) antenna configuration. However, embodiments are not limited to 4Tx, and can be extended to other transmitter configurations, including two-transmitter (2Tx) and 8-transmitter (8Tx) antenna configurations, for example. For the purpose of illustration, example configuration 400 is described with reference to example environment 100, where first communication device 102 uses example configuration 400 to transmit one or more data streams to second communication device 104. Second communication device 104 can be embodied by example communication device 200 in such an embodiment.

As shown in FIG. 4, example configuration 400 includes two transmit antennas 402.1 and 402.2 that are separated by a distance d from each other. Antennas 402.1 and 402.2 can each operate simultaneously using two orthogonal polarizations (e.g., horizontal and vertical, left hand circular and right hand circular, etc.), thereby being equivalent to four virtual antennas.

When closely spaced, antennas 402.1 and 402.2 form a Closely Spaced Cross Polarized Antenna Array (C-XPOL), and the eigenmode of the channel for such antenna configuration can be generally described by:

$$v_{XPOL}(\theta, c) = \begin{bmatrix} 1 \\ e^{-j\theta} \\ c \\ ce^{-j\theta} \end{bmatrix}$$ (3)

where $\theta$ denotes a phase difference due to physical separation (separation phase difference) between antennas 402.1 and 402.2 and c denotes a phase difference due to cross-polarization (cross-polarization phase difference) of antennas 402.1 and 402.2.

To have the signals transmitted by antennas 402.1 and 402.2 received at the same time (i.e., without relative phase offset) at communication device 104, a transmit precoder is applied at communication device 102 to compensate for the separation phase difference $\theta$ and the cross-polarization phase difference c. As described above, the transmit precoder is signaled by communication device 104 to communication device 102.

In an embodiment, the transmit precoder includes a first precoder component and a second precoder component. The first precoder component is configured to compensate for a long term or a wideband variation of the separation phase difference $\theta$. The second precoder component is configured to compensate for the cross-polarization phase difference c and/or a short term or a narrowband variation of the separation phase difference $\theta$. The first precoder component and the second precoder component are signaled at different frequencies, e.g., the first precoder component is signaled at a lower frequency than the second precoder component.

Figure 7:
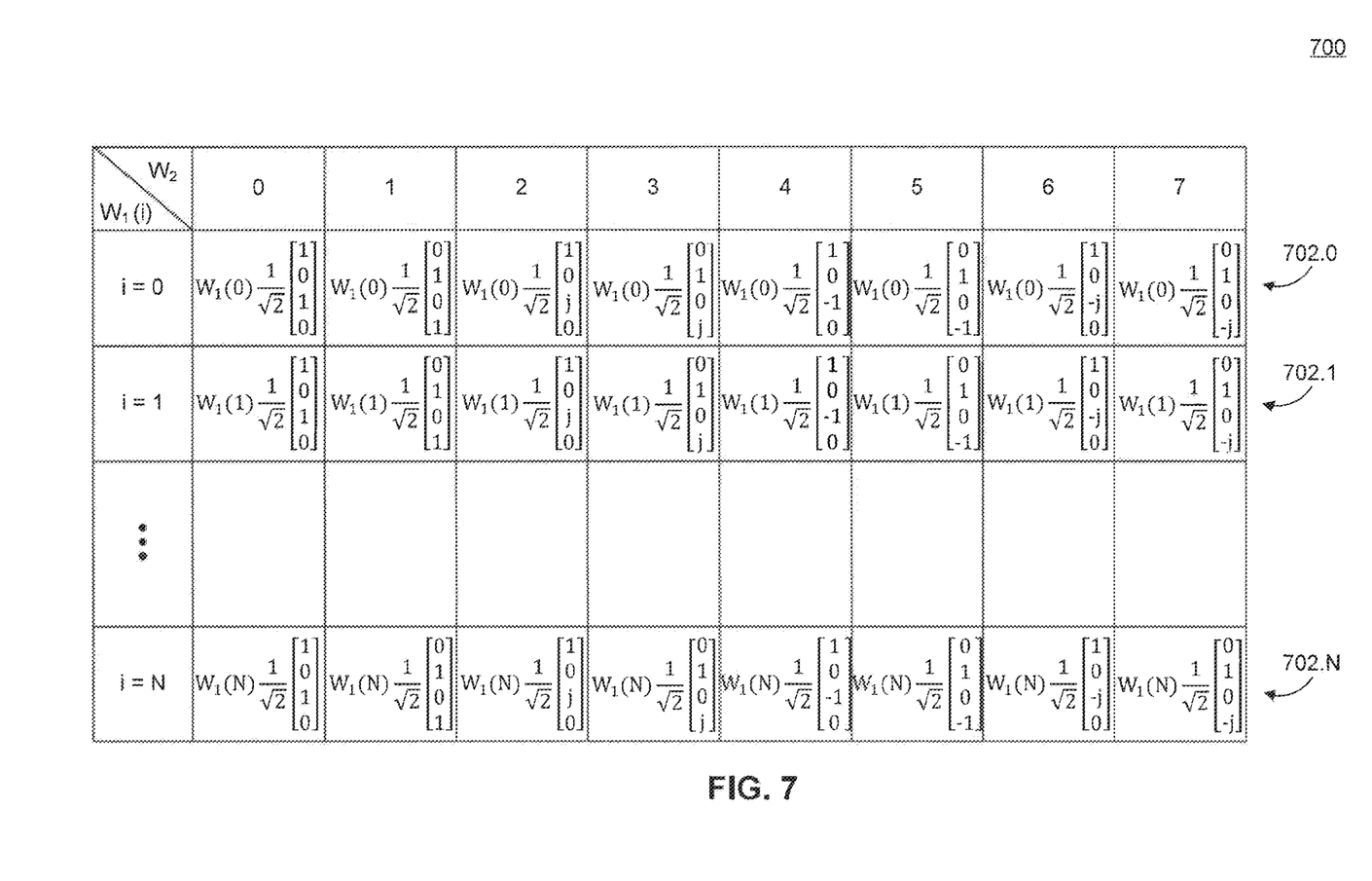

In an embodiment, sub-codebook 212 (of the transmit precoder codebook) designed for a C-XPOL antenna configuration includes a plurality of rows 702.0-702.N as illustrated by example 700 of FIG. 7. Example 700 is provided for the purpose of illustration only and is not limiting of embodiments. In this embodiment, the first precoder component is selected as a matrix from a plurality of matrices given by:

$$W_1(i) = \begin{bmatrix} X(i) & 0 \\ 0 & X(i) \end{bmatrix}, i = 0, \ldots, N \quad (4)$$

where $$X(i) = \begin{bmatrix} 1 & 1 \\ e^{-j\theta_{2i}} & e^{-j\theta_{2i+1}} \end{bmatrix},$$

$$\theta_i = \frac{2\pi i}{8},$$

and N is an integer. In an embodiment, N is equal to 3.

Once the first precoder component is selected, the second precoder component refines compensation for the separation phase difference θ and also compensates for the cross-polarization phase difference c. For example, referring to FIG. 7, if the first precoder component corresponds to $W_1(i=0)$, then the second precoder component $W_2$ identifies one of the transmit precoders of row 702.0. In an embodiment, as shown in FIG. 7, the second precoder component can take one of eight values (0 to 7) to identify the transmit precoder, with each identified transmit precoder capturing (in addition to the separation phase difference θ compensation captured by selecting the first precoder component) one out of four different ways to compensate for the cross-polarization phase difference c and one out of two ways to further refine the compensation for the separation phase difference θ. For example, in example 700, $W_2=0$ and $W_2=1$ provide the same cross-polarization phase compensation, but different granular compensation for the separation phase difference θ. Specifically, the transmit precoder corresponding to i=0 and $$W_2 = 0 \text{ is } \begin{bmatrix} 1 \\ e^{-j\theta_{2}j} \\ 1 \\ e^{-j\theta_{2i}} \end{bmatrix}$$

and the transmit precoder corresponding to i=0 and $W_2 = 1$ is $$\begin{bmatrix} 1 \\ e^{-j\theta_{2i+1}} \\ 1 \\ e^{-j\theta_{2i+1}} \end{bmatrix}.$$

Similarly, $W_2=2$ and $W_2=3$ ($W_2=4$ and $W_2=5$, or $W_2=6$ and $W_2=7$) enable the same cross-polarization phase compensation, but provide different granular compensation for the separation phase difference θ.

Figure 8:
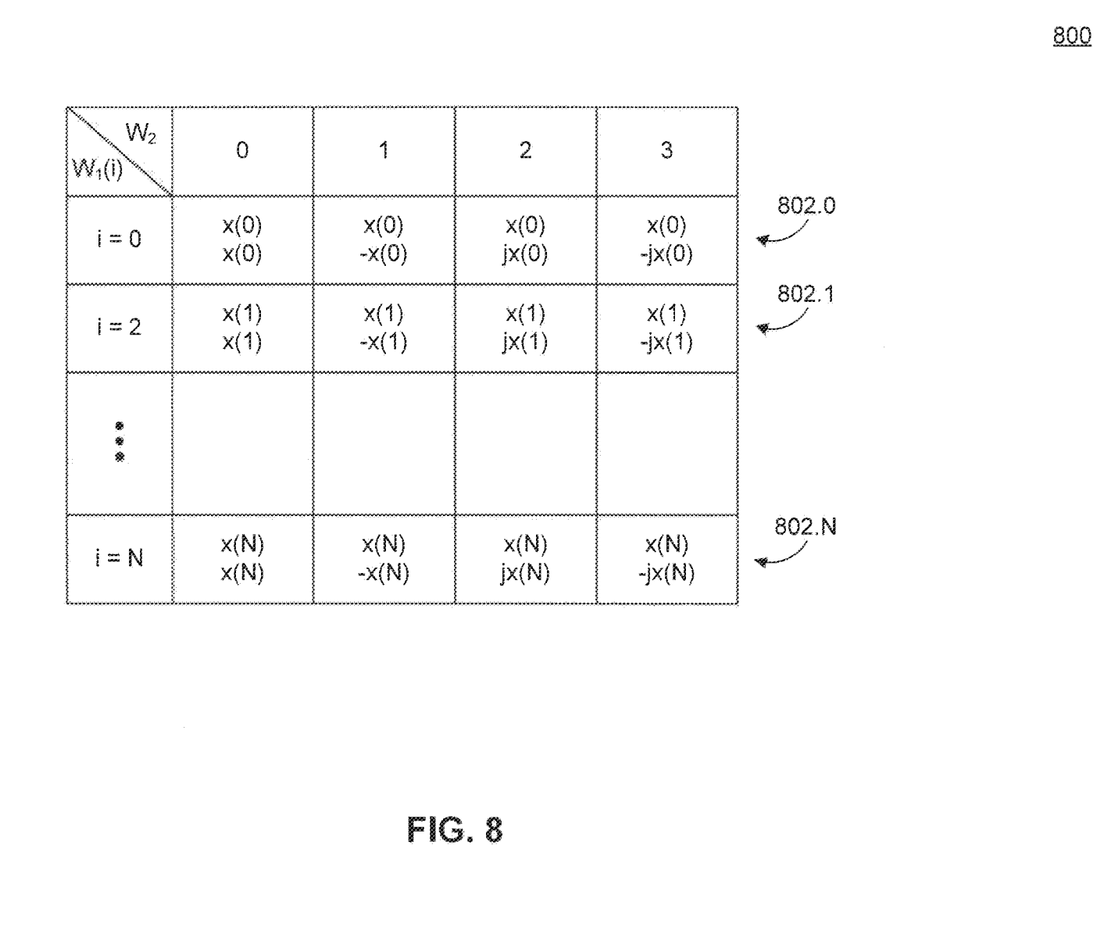

In another embodiment, sub-codebook 212 (of the transmit precoder codebook) designed for a C-XPOL antenna configuration includes a plurality of matrices 802.0-802.N as illustrated by example 800 in FIG. 8. The plurality of matrices are given by:

$$W_1(i) = \begin{bmatrix} X(i) & X(i) & X(i) & X(i) \\ X(i) & -X(i) & jX(i) & -jX(i) \end{bmatrix}, \quad (5)$$

$$i = 0, \ldots, N$$

where $$X(i) = \begin{bmatrix} 1 \\ e^{-j\theta_i} \end{bmatrix}$$

and $$\theta_i = \frac{2\pi i}{4}.$$

In an embodiment, N is equal to 3.

Each matrix 802.0-802.N includes a plurality of column vectors (e.g., 4 in this example embodiment) each of which corresponds to a transmit precoder for the other communication device. In an embodiment, the first precoder component is signaled by signaling an index associated with one of the plurality of matrices 802.0-802.N (which is equivalent to signaling four transmit precoders to the other communication device in this embodiment). The second precoder component is signaled to identify as the transmit precoder one of the plurality of column vectors of the matrix signaled by the first precoder component. In this embodiment, the first precoder component compensates for the separation phase difference θ and the second precoder component compensates for the cross-polarization phase difference c.

Returning to FIG. 2, in another embodiment, as mentioned above, transmit precoder codebook 208 includes a sub-codebook 214 designed for a Widely Spaced Cross Polarized Antenna Array configuration at the other communication device. Example embodiments for designing and using sub-codebook 214 are described below.

Figure 5:
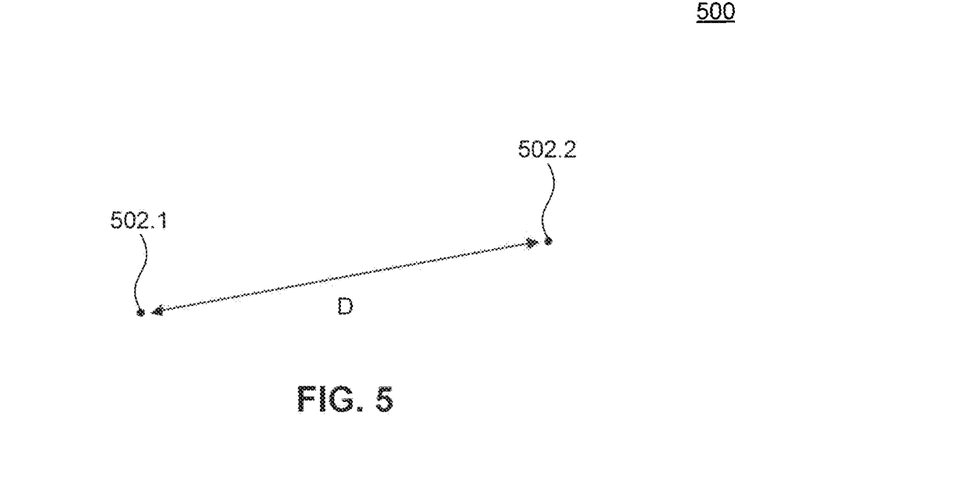
FIG. 5 illustrates an example Widely Spaced Cross Polarized Antenna Array configuration.

FIG. 5 illustrates an example Widely Spaced Cross Polarized Antenna Array configuration 500. Example configuration 500 is provided for the purpose of illustration only and is not limiting of embodiments. For example, example configuration 500 illustrates a four-transmitter (4Tx) antenna configuration. However, embodiments are not limited to 4Tx, and can be extended to other transmitter configurations, including two-transmitter (2Tx) and 8-transmitter (8Tx) antenna configurations, for example. For the purpose of illustration, example configuration 500 is described with reference to example environment 100, where first communication device 102 uses example configuration 500 to transmit one or more data streams to second communication device 104. Second communication device 104 can be embodied by example communication device 200 in such an embodiment.

As shown in FIG. 5, example configuration 400 includes two transmit antennas 502.1 and 502.2 that are separated by a distance D from each other. Distance D is sufficiently large that antennas 502.1 and 502.2 are uncorrelated. Antennas 502.1 and 502.2 can each operate simultaneously using two orthogonal polarizations (e.g., horizontal and vertical, left hand circular and right hand circular, etc.), thereby being equivalent to four virtual antennas.

Because antennas 502.1 and 502.2 are widely spaced from each other, a transmit precoder for this antenna configuration can be similar to one of an uncorrelated antenna scenario and can be described as:

$$v_{UNCORR}(\theta_1, \theta_2, c) = \begin{bmatrix} 1 \\ e^{-j\theta_1} \\ c \\ ce^{-j\theta_2} \end{bmatrix} \quad (6)$$

where $c \in \{1, -1, j, -j\}$, and $\theta_1$ and $\theta_2$ denote phase differences. In other words, each virtual antenna can have an independent phase associated with its transmitted signal.

Figure 9:
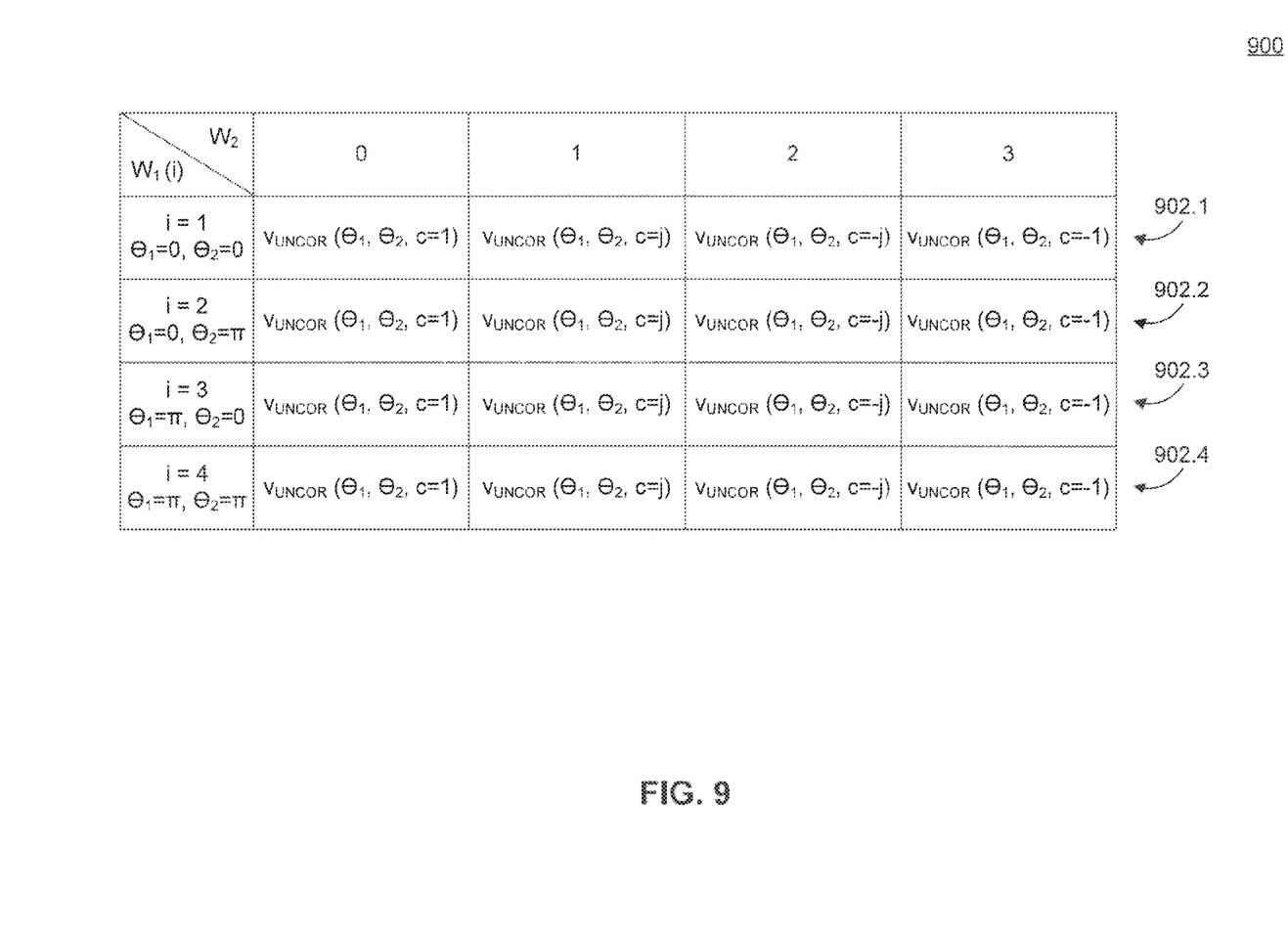

In an embodiment, sub-codebook 214 (of the transmit precoder codebook) designed for a Widely Spaced Cross-Polarized Antenna configuration includes a plurality of matrices 902.1, 902.2, 902.3, and 902.4 as illustrated by example 900 of FIG. 9. In another embodiment, sub-codebook 214 can include more or less than four matrices as shown in FIG. 9.

In an embodiment, the plurality of matrices 902.1, 902.2, 902.3, and 902.4 are given by:

$$W_1(1) = [\,v_{UNCOR}(\theta_1, \theta_2, c=1)\ \ v_{UNCOR}(\theta_1, \theta_2, c=j)\ \ v_{UNCOR}(\theta_1, \theta_2, c=-j)\ \ v_{UNCOR}(\theta_1, \theta_2, c=-1)\,]_{\theta_1=0, \theta_2=0}$$

$$W_1(2) = [\,v_{UNCOR}(\theta_1, \theta_2, c=1)\ \ v_{UNCOR}(\theta_1, \theta_2, c=j)\ \ v_{UNCOR}(\theta_1, \theta_2, c=-j)\ \ v_{UNCOR}(\theta_1, \theta_2, c=-1)\,]_{\theta_1=0, \theta_2=\pi}$$

$$W_1(3) = [\,v_{UNCOR}(\theta_1, \theta_2, c=1)\ \ v_{UNCOR}(\theta_1, \theta_2, c=j)\ \ v_{UNCOR}(\theta_1, \theta_2, c=-j)\ \ v_{UNCOR}(\theta_1, \theta_2, c=-1)\,]_{\theta_1=\pi, \theta_2=0}$$

$$W_1(4) = [\,v_{UNCOR}(\theta_1, \theta_2, c=1)\ \ v_{UNCOR}(\theta_1, \theta_2, c=j)\ \ v_{UNCOR}(\theta_1, \theta_2, c=-j)\ \ v_{UNCOR}(\theta_1, \theta_2, c=-1)\,]_{\theta_1=\pi, \theta_2=\pi}$$

wherein $$v_{UNCORR}(\theta_1, \theta_2, c) = \begin{bmatrix} 1 \\ e^{-j\theta_1} \\ c \\ ce^{-j\theta_2} \end{bmatrix}.$$

In an embodiment, the transmit precoder includes a first precoder component and a second precoder component. In an embodiment, communication device 104 (e.g., using processor 204) is configured to select the first precoder component as a matrix from the plurality of matrices 902.1-902.4. In an embodiment, after determining the transmit precoder as described above (e.g., the transmit precoder that maximizes signal strength), communication device 104 (e.g., using processor 204) selects the first precoder component as the matrix of the plurality of matrices 902.1-902.4 that includes the determined transmit precoder. For example, if the determined transmit precoder is included in the row vector corresponding to i=1 ($\theta_1=0$, $\theta_2=0$), then the selected first precoder component corresponds to $W_1$(i=1). The index (i=1) corresponding to the selected first precoder component is signaled to the other communication device.

As shown in FIG. 9, each matrix of the plurality of matrices 902.1-902.4 includes a plurality (e.g., four) column vector, each corresponding to a respective transmit precoder. As such, signaling a first precoder component is equivalent to signaling a plurality of transmit precoders. To further refine the choice of transmit precoder, communication device 104 (e.g., using processor 204) selects the second precoder component to identify one column vector of the plurality of column vectors of the signaled first precoder component. For example, if the determined transmit precoder corresponds to the precoder indicated by $v_{UNCOR}(\theta_1=0, \theta_2=\pi, c=j)$, then after signaling the index i=2 for the first precoder component, the second precoder component is signaled by signaling $W_2$=1.

In an embodiment, as mentioned above, the first precoder component is signaled at a lower frequency than the second precoder component. As such, in between signaling of the first precoder component, the second precoder component can be signaled one or more times to identify one or more transmit precoders of the plurality of transmit precoders signaled by the first precoder component. For example, if the selected first precoder component corresponds to $W_1$(i=1) in example 900, then the second precoder component can be selected from the transmit precoders indicated by $v_{UNCOR}(\theta_1=0, \theta_2=0, c=1)$, $v_{UNCOR}(\theta_1=0, \theta_1=0, c=j)$, $v_{UNCOR}(\theta_1=0, \theta_2=0, c=-j)$, and $v_{UNCOR}(\theta_1=0, \theta_2=0, c=-1)$. In an embodiment, in between signaling of the first precoder component, only the subset of transmit precoders identified by the signaled first precoder component is tested to determine the transmit precoder that is identified by the second precoder component.

Embodiments described above illustrate the use of example codebooks to signal a rank 1 transmit precoder to another communication device. Higher rank precoders (to support more than one data streams simultaneously) can be formed from multiple rank 1 precoders. For example, a 4×2 transmit precoder can be formed by concatenating two 4×1 precoders. In an embodiment, to ensure complete orthogonality between multiple transmitted data streams, the column vectors of a (rank>1) transmit precoder are selected to be orthogonal to each other. In an embodiment, for any rank>1 precoder, the i-th column of the precoder is generated as diag($HM_i$)v, where diag($HM_i$) denotes the diagonal matrix corresponding to the i-th column of a Hadamard matrix, and v denotes the rank 1 transmit precoder.

For example, for a 4Tx antenna configuration, the Hadamard matrix is given by:

$$HM = \begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad (7)$$

Accordingly, a rank 2 precoder can be generated by having the first column correspond to the determined rank 1 transmit precoder, and the second column correspond to the product of a diagonal matrix (having diagonal elements corresponding to the second column of the Hadamard matrix) by the rank 1 precoder.

Embodiments have been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A communication device, comprising:
a channel estimation module configured to generate a channel estimate of a channel from another communication device;
a processor configured to determine a four-transmitter (4Tx) precoder from a codebook based on the channel estimate, wherein the 4Tx precoder includes a first precoder component and a second precoder component; and
a transmitter configured to signal the first precoder component and the second precoder component to the another communication device;
wherein the processor is further configured to select an index for the first precoder component, wherein the transmitter is configured to signal the index to the another communication device, wherein the index indicates a plurality of 4Tx precoders from a finite set of consecutive uniformly spaced 4Tx precoders, and wherein the plurality of 4Tx precoders are non-consecutive within the finite set of consecutive uniformly spaced 4Tx precoders.

2. The communication device of claim 1, wherein the transmitter is configured to signal the first precoder component at a lower frequency than the second precoder component to the another communication device.

3. The communication device of claim 1, wherein the processor is further configured to determine an antenna configuration of the another communication device and to determine the 4Tx precoder from a sub-codebook of the codebook associated with the determined antenna configuration.

4. The communication device of claim 3, wherein the antenna configuration of the another communication device corresponds to a Uniform Linear Array configuration, and wherein the first precoder component is configured to compensate for a long term or a wideband variation of a separation phase difference between antennas of the another communication device.

5. The communication device of claim 3, wherein the antenna configuration of the another communication device corresponds to a Closely Spaced Cross Polarized Antenna Array configuration, and wherein the first precoder component is configured to compensate for a long term or a wideband variation of a separation phase difference between antennas of the another communication device.

6. The communication device of claim 3, wherein the antenna configuration of the another communication device corresponds to a Closely Spaced Cross Polarized Antenna Array configuration, and wherein the processor is further configured to select the first precoder component as a matrix from a plurality of matrices given by:

$$W_1(i) = \begin{bmatrix} X(i) & 0 \\ 0 & C(i) \end{bmatrix}, i = 0, \ldots, N$$

wherein $$X(i) = \begin{bmatrix} 1 & 1 \\ e^{-j\theta_{2i}} & e^{-j\theta_{2i+1}} \end{bmatrix},$$

$$\theta_i = \frac{2\pi i}{8},$$

and N is an integer.

7. The communication device of claim 4, wherein the second precoder component is configured to compensate for a short term or a narrowband variation of the separation phase difference.

8. The communication device of claim 5, wherein the second precoder component is configured to compensate for a cross-polarization phase difference between antennas of the another communication device.

9. The communication device of claim 8, wherein the second precoder component is further configured to compensate for a short term or a narrowband variation of the separation phase difference.

10. A communication device, comprising:
a channel estimation module configured to generate a channel estimate of a channel from another communication device;
a processor configured to determine a four-transmitter (4Tx) precoder from a codebook based on the channel estimate, wherein the 4Tx precoder includes a first precoder component and a second precoder component; and
a transmitter configured to signal the first precoder component and the second precoder component to the another communication device;
wherein the processor is further configured to determine an antenna configuration of the another communication device and to determine the 4Tx precoder from a sub-codebook of the codebook associated with the determined antenna configuration; and
wherein the antenna configuration of the another communication device corresponds to a Uniform Linear Array configuration, and wherein the processor is further configured to select the first precoder component as a vector from a plurality of vectors of a precoder matrix, wherein the precoder matrix is given by:

$$W_1(i) = [v_{ULA}(\theta_{2i-2}), v_{ULA}(\theta_{2i}), v_{ULA}(\theta_{2i+1})], i = 0, \ldots, N$$

wherein $$\theta_k = \frac{2\pi k}{16}$$

and N is an integer, and wherein $v_{ULA}(\theta)$ is given by:

$$v_{ULA}(\theta) = \begin{bmatrix} 1 \\ e^{-j\theta} \\ e^{-j2\theta} \\ e^{-j3\theta} \end{bmatrix}.$$

11. The communication device of claim 10, wherein the vector of the precoder matrix includes a plurality of elements, wherein the second precoder component is configured to select an element of the plurality of elements of the vector as the 4Tx precoder.

12. The communication device of claim 10, wherein the processor is further configured to select an index for the first precoder component, wherein the transmitter is configured to signal the index to the another communication device, wherein the index indicates a plurality of 4Tx precoders from a finite set of consecutive uniformly spaced 4Tx precoders, and wherein the plurality of 4Tx precoders are non-consecutive within the finite set of consecutive uniformly spaced 4Tx precoders.

13. The communication device of claim 10, wherein the first precoder component is configured to compensate for a long term or a wideband variation of a separation phase difference between antennas of the another communication device.

14. A communication device, comprising:
a channel estimation module configured to generate a channel estimate of a channel from another communication device;
a processor configured to determine a four-transmitter (4Tx) precoder from a codebook based on the channel estimate, wherein the 4Tx precoder includes a first precoder component and a second precoder component; and
a transmitter configured to signal the first precoder component and the second precoder component to the another communication device;
wherein the processor is further configured to determine an antenna configuration of the another communication device and to determine the 4Tx precoder from a sub-codebook of the codebook associated with the determined antenna configuration; and
wherein the antenna configuration of the another communication device corresponds to a Widely Spaced Cross Polarized Antenna Array configuration, and wherein the processor is further configured to select the first precoder component as a matrix from a plurality of matrices given by:

15. The communication device of claim 14, wherein the matrix includes a plurality of column vectors, and wherein the second precoder component is configured to select one of the plurality of column vectors of the matrix as the 4Tx precoder.

16. The communication device of claim 14, wherein the processor is further configured to select an index for the first precoder component, wherein the transmitter is configured to signal the index to the another communication device, wherein the index indicates a plurality of 4Tx precoders from a finite set of consecutive uniformly spaced 4Tx precoders, and wherein the plurality of 4Tx precoders are non-consecutive within the finite set of consecutive uniformly spaced 4Tx precoders.

17. A system, comprising:
a first communication device; and
a second communication device,
wherein the first communication device comprises:
a channel estimation module configured to generate a channel estimate of a channel from the second communication device;
a processor configured to determine a four-transmitter (4Tx) precoder from a codebook based on the channel estimate, wherein the 4Tx precoder includes a first precoder component and a second precoder component; and
a transmitter configured to signal the first precoder component and the second precoder component to the second communication device;
wherein the processor is further configured to select an index for the first precoder component, wherein the transmitter is configured to signal the index to the second communication device, wherein the index indicates a plurality of 4Tx precoders from a finite set of consecutive uniformly spaced 4Tx precoders, and wherein the plurality of 4Tx precoders are non-consecutive within the finite set of consecutive uniformly spaced 4Tx precoders.

18. The system of claim 17, wherein the first communication device includes a user equipment (UE) and the second communication device includes a base station.

19. The system of claim 17, wherein the first precoder component is configured to compensate for a long term or a wideband variation of a separation phase difference between antennas of the second communication device.

$$W_1(1) = [\, v_{UNCOR}(\theta_1, \theta_2, c = 1) \quad v_{UNCOR}(\theta_1, \theta_2, c = j) \quad v_{UNCOR}(\theta_1, \theta_2, c = -j) \quad v_{UNCOR}(\theta_1, \theta_2, c = -1)\,]_{\theta_1=0, \theta_2=0}$$

$$W_1(2) = [\, v_{UNCOR}(\theta_1, \theta_2, c = 1) \quad v_{UNCOR}(\theta_1, \theta_2, c = j) \quad v_{UNCOR}(\theta_1, \theta_2, c = -j) \quad v_{UNCOR}(\theta_1, \theta_2, c = -1)\,]_{\theta_1=0, \theta_2=\pi}$$

$$W_1(3) = [\, v_{UNCOR}(\theta_1, \theta_2, c = 1) \quad v_{UNCOR}(\theta_1, \theta_2, c = j) \quad v_{UNCOR}(\theta_1, \theta_2, c = -j) \quad v_{UNCOR}(\theta_1, \theta_2, c = -1)\,]_{\theta_1=\pi, \theta_2=0}$$

$$W_1(4) = [\, v_{UNCOR}(\theta_1, \theta_2, c = 1) \quad v_{UNCOR}(\theta_1, \theta_2, c = j) \quad v_{UNCOR}(\theta_1, \theta_2, c = -j) \quad v_{UNCOR}(\theta_1, \theta_2, c = -1)\,]_{\theta_1=\pi, \theta_2=\pi}$$

wherein $$v_{UNCORR}(\theta_1, \theta_2, c) = \begin{bmatrix} 1 \\ e^{-j\theta_1} \\ c \\ ce^{-j\theta_2} \end{bmatrix}.$$

20. The system of claim 19, wherein the second precoder component is configured to compensate for a short term or a narrowband variation of the separation phase difference.

\* \* \* \* \*

UNITED STATES PATENT AND TRADEMARK OFFICE
CERTIFICATE OF CORRECTION

PATENT NO. : 9,130,621 B2  
APPLICATION NO. : 14/147245  
DATED : September 8, 2015  
INVENTOR(S) : Gomadam et al.

Page 1 of 1

It is certified that error appears in the above-identified patent and that said Letters Patent is hereby corrected as shown below:

Claims

Column 13, Lines 26-27, claim 1. Please replace "communication device:" with --communication device;--.

Column 14, Line 61, claim 10. Please replace
"$W_1(i) = [v_{ULA}(\theta_{2i-2})v_{ULA}(\theta_{2i})v_{ULA}(\theta_{2i+1})], i = 0, \ldots, N$" with
--$W_1(i) = [v_{ULA}(\theta_{2i-2}) \quad v_{ULA}(\theta_{2i-1}) \quad v_{ULA}(\theta_{2i}) \quad v_{ULA}(\theta_{2i+1})], i = 0, \ldots, N$--.

Signed and Sealed this  
Twenty-second Day of March, 2016

Michelle K. Lee  
*Director of the United States Patent and Trademark Office*